United States Patent [19]

Johnson

[11] 4,037,738
[45] July 26, 1977

[54] TRANSFER APPARATUS

[75] Inventor: Richard B. Johnson, Mount Airy, Md.

[73] Assignee: American Chain & Cable Company, Inc., Bridgeport, Conn.

[21] Appl. No.: 621,135

[22] Filed: Oct. 9, 1975

[51] Int. Cl.² .............................................. B65G 47/04
[52] U.S. Cl. ................................ 214/38 CC; 198/774; 214/512
[58] Field of Search ................ 214/38 C, 38 CC, 512; 198/105, 218, 219; 254/2 R, 2 C

[56] References Cited

U.S. PATENT DOCUMENTS

| | | | |
|---|---|---|---|
| 3,182,823 | 5/1965 | Chasar | 214/38 CC X |
| 3,731,790 | 5/1973 | Esser et al. | 198/219 |
| 3,746,148 | 7/1973 | Hilger et al. | 198/219 |

Primary Examiner—Robert G. Sheridan
Attorney, Agent, or Firm—Barnes, Kisselle, Raisch & Choate

[57] ABSTRACT

An apparatus for transferring articles between a pick up station such as a conveyor and a deposit station comprising a conveyor and a transfer car which is supported for movement between the conveyor and a station. The car having interdigitating means thereon adapted to interdigitate with said conveyor when the transfer car is at a position adjacent the conveyor. The interdigitating means is supported on the car for vertical movement such that the interdigitating means may be moved upwardly to lift an article from the conveyor or the station and downwardly to lower the article on the conveyor or the station.

11 Claims, 46 Drawing Figures

FIG. 16 PLAN VIEW WITH TOP FRAME REMOVED

FIG. 17A SPROCKET, CHAIN & LIFT CAM SYSTEM LOWERED AT PICK UP POSITION

FIG. 17B LOWERING CAM

FIG. 17C LOWERING SPROCKET

FIG. 19A SPROCKET, CHAIN & LIFT CAM SYSTEM LIFTED & TRAVELING TO DEPOSIT POSITION

FIG. 19B LOWERING CAM

FIG. 19E LIFTING CAM

FIG. 22A  SPROCKET, CHAIN & LIFT CAM SYSTEM LOWERED & TRAVELING TO PICK UP STATION

FIG. 22B  LOWERING CAM

FIG. 22C  LOWERING SPROCKET  
DRIVE END

FIG. 22D  LIFTING SPROCKET  
TAKE UP END

FIG. 22E  LIFTING CAM

TRANSFER APPARATUS

This invention relates to transfer systems and particularly to systems for transferring articles between a conveyor and a remote station.

BACKGROUND OF THE INVENTION

In the handling of articles which are transported from one area to another it is necessary to deposit and pick up the articles or loads. A typical situation is when articles or loads are removed from a conveyor such as a roller conveyor and transferred to a spaced location. One common system utilized is separate forklift trucks or similar devices. Such devices are not applicable to automatic storage and retrieval systems wherein accuracy is required in positioning the load to a close tolerance for pick up by an automatic device such as a computer controlled crane. Another system that has been used is to utilize a transfer car that carries a piece of the conveyor that acts both as a transporting conveyor when the car is in position adjacent the conveyor and as a carrier for holding the article or load when the car is moving to a remote station. In such a system, since the car leaves the transportation conveyor, a gap is created interrupting the flow of loads or articles.

Accordingly, among the objects of the invention are to provide a system wherein a transfer car has interdigitating capability with a transportation conveyor or a pick up station; which leaves no conveyor gap permitting continuous operation; wherein there is no external control source required; wherein only one drive is required for all functions of moving the car and transferring the load between the conveyor and a remote station; and wherein the system may be adapted to either pick up at a conveyor and deposit at a station or the reverse, namely, pick up at a station and deposit on a conveyor.

SUMMARY OF THE INVENTION

In accordance with the invention, one apparatus for transferring articles or loads between a conveyor and a station comprises a conveyor and a transfer car, which is supported for movement between the conveyor and a station. The car has interdigitating means thereon adapted to interdigitate with the conveyor when the transfer car is at a position adjacent the conveyor. The interdigitating means is supported on the car for vertical movement such that the interdigitating means may be moved upwardly to lift an article from the conveyor or the station and downwardly to lower the article on the conveyor or the station. The system can also be used for transfer between two stations, neither of which is a conveyor.

GENERAL DESCRIPTION

Figure 1:
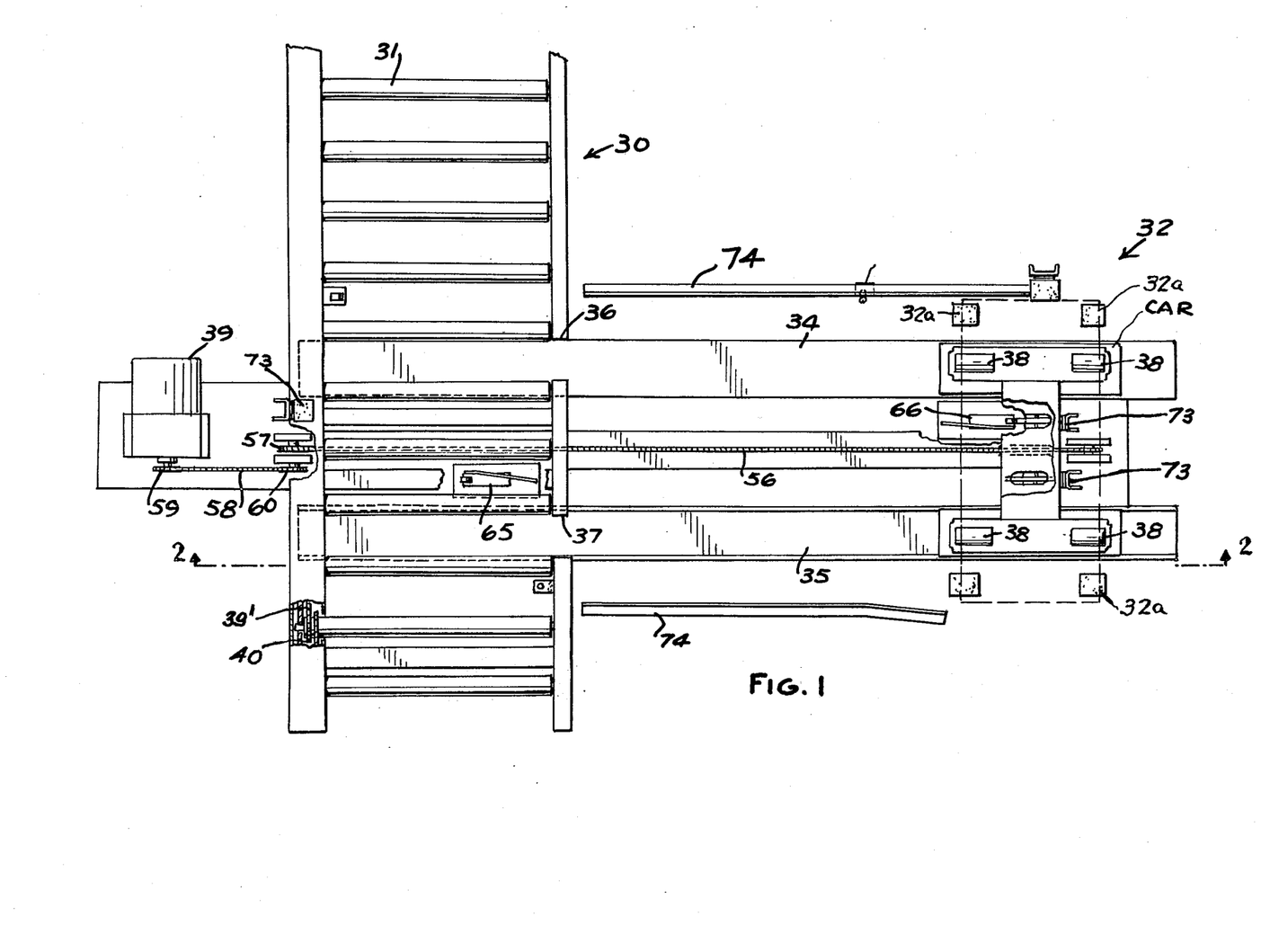
FIG. 1 is a part sectional plan view of a system embodying the invention.
Figure 2:
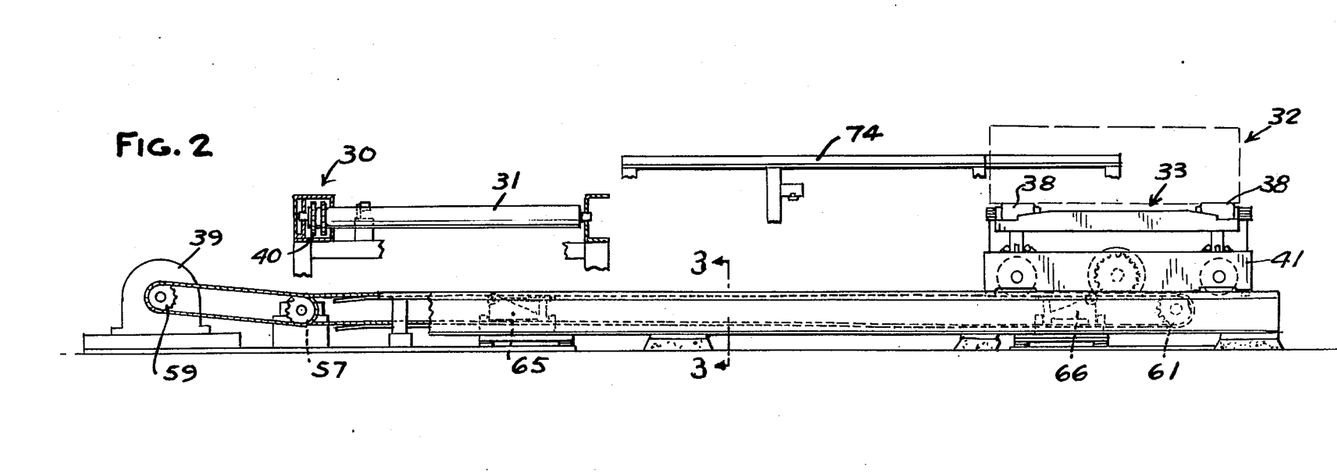
FIG. 2 is a fragmentary elevational view of the system.
Figure 3:
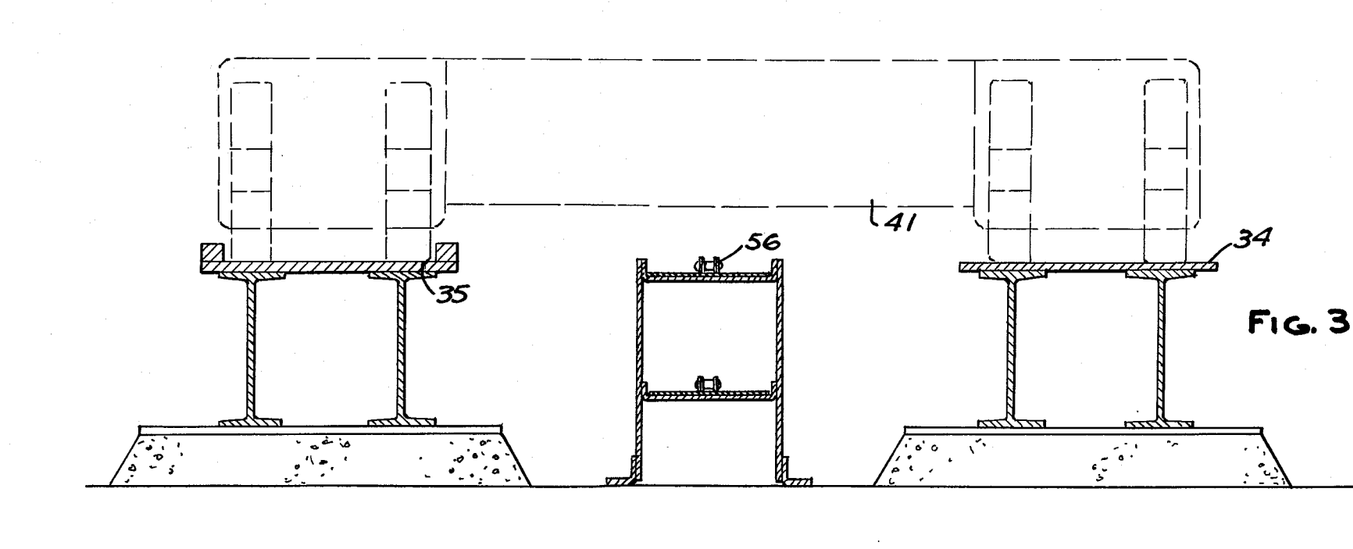
FIG. 3 is a sectional view on an enlarged scale taken along the line 3—3 in FIG. 2.
Figure 4:
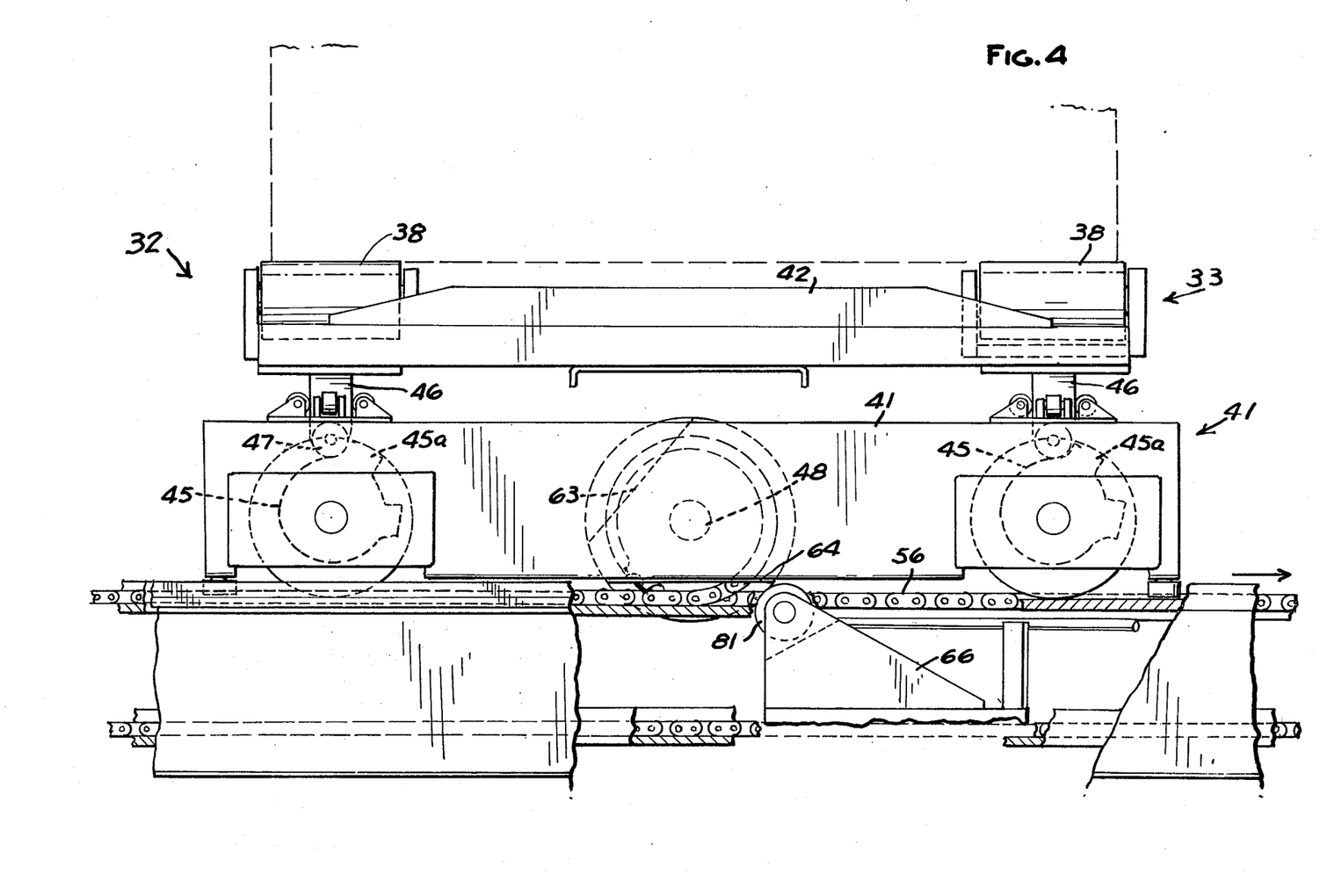
FIG. 4 is a fragmentary part sectional view on an enlarged scale of a portion of the system shown in FIG. 2.

Referring to FIGS. 1 and 2, the system includes a roller conveyor 30 comprising a plurality of longitudinally spaced laterally extending rollers 31, a pick-up station 32, and a transfer car 33 movable along tracks 34, 35 between the conveyor 30 and station 32 to pick up a load from the conveyor 30 and deposit the load on station 32.

At the area where the tracks 34, 35 underlie the conveyor 30, portions of the side rails of the conveyor are cut away as at 36, 37 to permit rollers 38 on the car 33 to interdigitate. As presently described, the transfer car 33 includes means for raising and lowering the rollers 38 so that the rollers 38 can be raised relative to the rollers 31 to lift an article or load from the conveyor 30 and transport it to a deposit position or station 32 wherein the rollers 38 can be lowered to deposit the article or load onto the spaced posts 32a at the deposit position 32. The spaced posts 32a permit movement inwardly of the lift portion of a storage crane that may form part of a storage and retrieval system. Alternatively, a conveyor can be provided at the station 32 for receiving the load and moving it to another destination.

As presently described, power for moving the transfer car as well as for raising and lowering the rollers 38 is obtained from a single motor 39.

The conveyor may have the rollers 31 thereon driven in any conventional manner as by sprockets 39' and chains 40. The conveyor drive preferably is of the type that can be readily stopped so that the load thereon is ready for pick-up at the pick-up station. The conveyor may comprise a plurality of separately driven sections which are individually controlled so that no load will be moved into position for pick-up by the transfer car if there is already a load in position to be picked up.

DESCRIPTION

Figures 5, 6, 7:
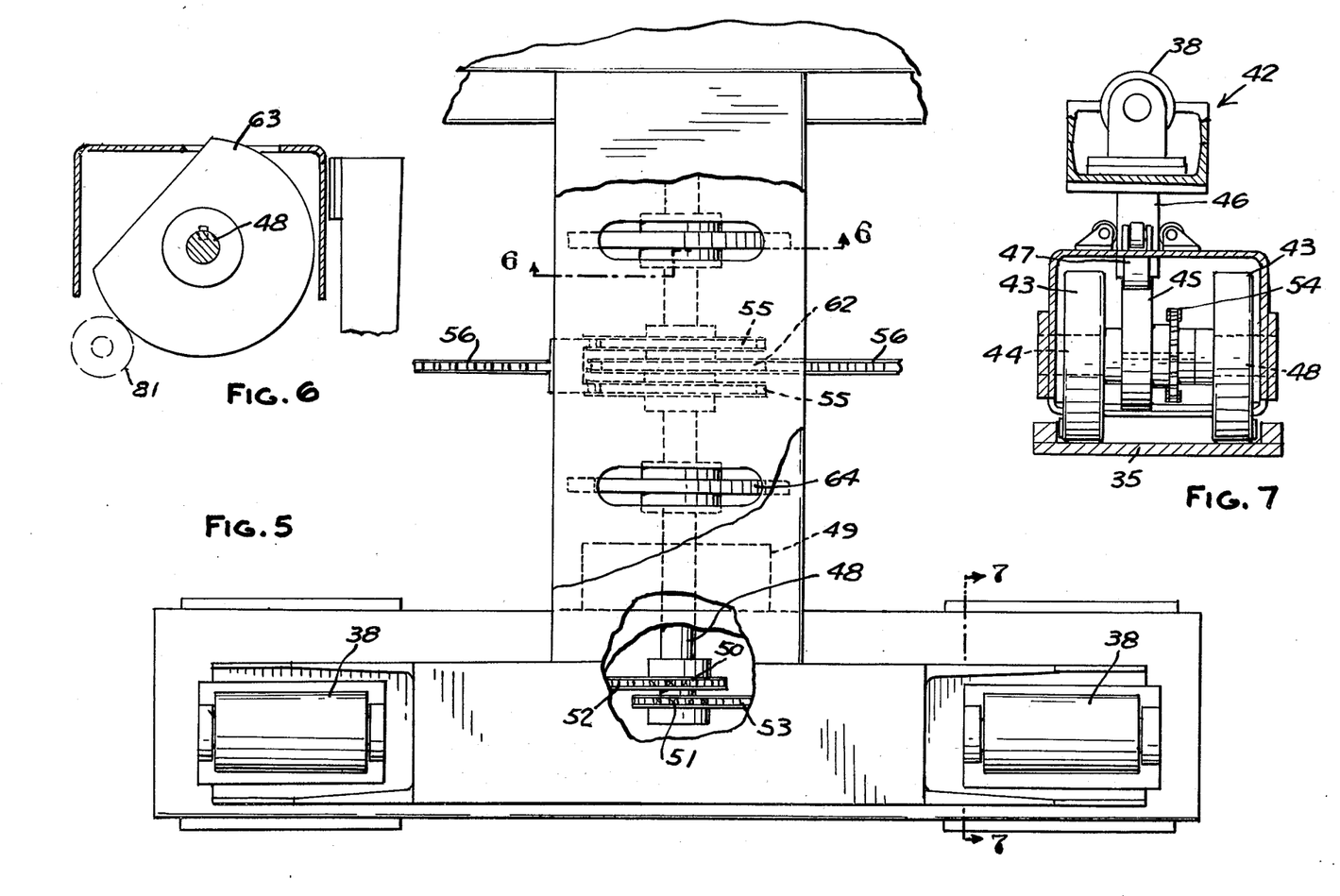
FIG. 5 is a fragmentary part sectional plan view of a portion of the system shown in FIG. 4.
FIG. 6 is a fragmentary sectional view taken along the line 6—6 in FIG. 5.
FIG. 7 is a fragmentary sectional view taken along the line 7—7 in FIG. 5.
Figure 8:
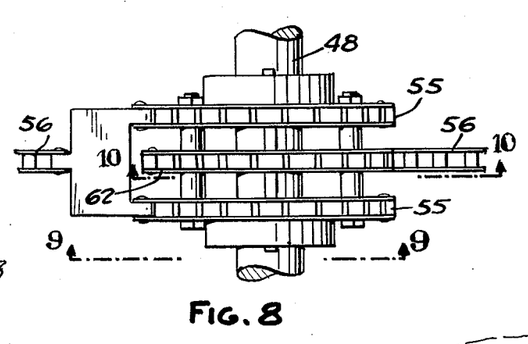
FIG. 8 is a fragmentary view of a portion of the system shown in FIG. 5.
Figure 9:
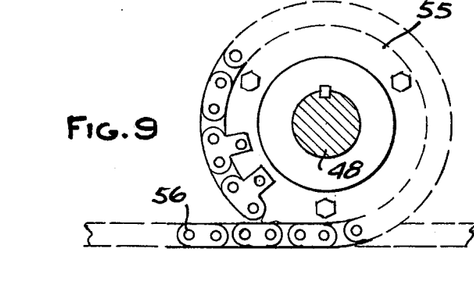
FIG. 9 is a fragmentary sectional view taken along the line 9—9 in FIG. 8.
Figure 10:
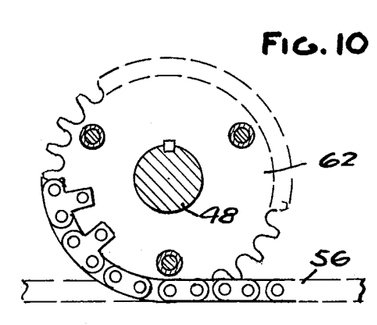
FIG. 10 is a fragmentary sectional view taken along the line 10—10 in FIG. 8.

Referring to FIGS. 1-13, the transfer car 33 comprises a lower frame assembly 41 and an upper frame assembly 42, each of which is H-shaped. The lower frame assembly 41 includes wheels 43 at the extremeties of the sides thereof which are rotatably mounted for free rotational movement on axles 44 (FIG. 7). A cam 45 is fixed to each axle 44 and is engaged by a cam follower 46 having a roller 47 thereon engaging the periphery of the cam 45 and fixed to its upper end to the upper frame assembly 42. When each cam 45 is rotated, as presently described, the respective cam follower 46 is raised and lowered to raise and lower the upper frame assembly 42 and, in turn, the interdigitating rollers 38 mounted thereon. Cams include stops 45a.

By this arrangement, the axles 44 are free to rotate, when the car is not traveling to permit lifting and lowering the top frame assembly 42 by rotating axles 44. In addition, the wheels 43 are free to rotate and the cams 45 are able to remain fixed holding the top frame assembly 42 lifted or lowered while the car is traveling.

Figure 11:
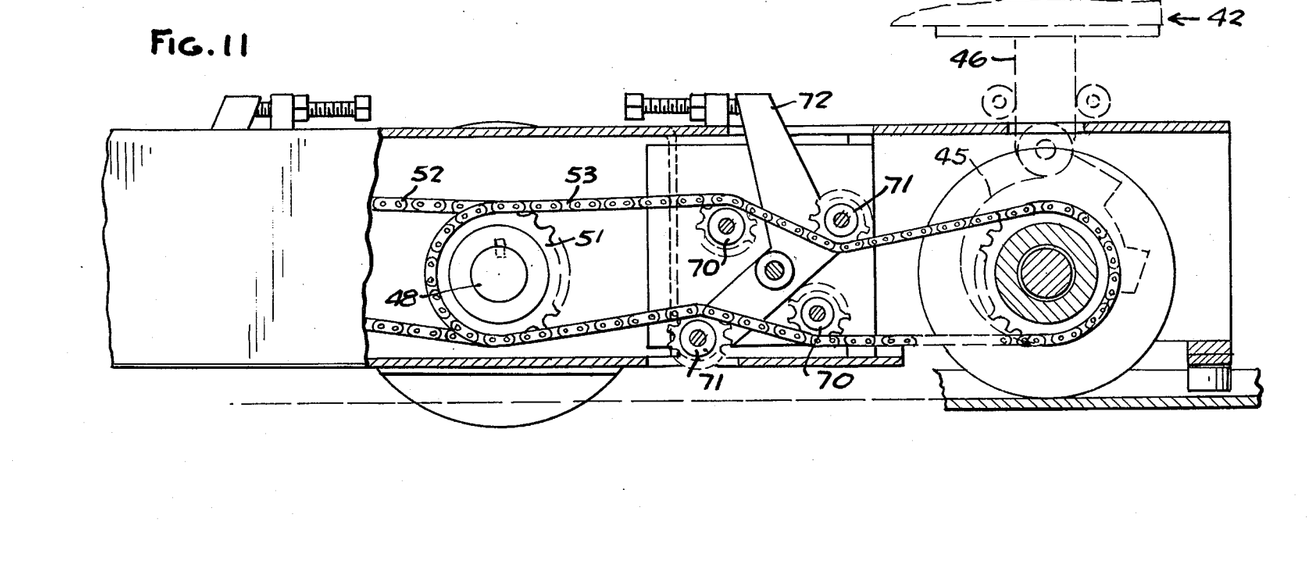
FIG. 11 is a part sectional elevational view of a part of the system shown in FIG. 4, showing the parts in a different operative position.

A main shaft 48 is mounted in the center of the lower frame assembly for rotation in pillow blocks 49. Sprockets 50, 51 are fixed on the shaft 48 and chains 52, 53 are trained thereon and extend to sprockets 54 fixed on axles 44 to transmit lifting and lowering forces to the cams 45. As shown in FIG. 11, idler sprockets 70 rotatably mounted on fixed shafts and idler sprockets 71 mounted on an adjustable lever 72 are provided in engagement with chains 52, 53 in order to maintain tension thereon.

In addition, sprockets 55 are fixed on the center of shaft 48. One end of a chain 56 is connected to sprockets 55 and is trained over a sprocket 57 which is driven by the motor 39 by a chain 58 trained over sprockets 59 on the shaft of the motor and sprockets 60 on the shaft of the sprocket 57. The other end of the chain 56 passes over an idler sprocket 61 adjacent the station 32 and is connected to a sprocket 62 also fixed on the shaft 48.

Cams 63, 64 are fixed to shaft 48 and are engaged by pivoting latches 65, 66 along the path of the transfer car to stop the car and permit rotation of the shaft 48 at the conveyor and station so that the chain 56 will function to rotate the shaft 48 and raise or lower the upper frame assembly and, in turn, the interdigitating rollers 38. As the transfer car approaches the end of its movement, it engages shock absorbing pads 73. Guide rails 74 guide the load on the transfer car.

Figure 12:
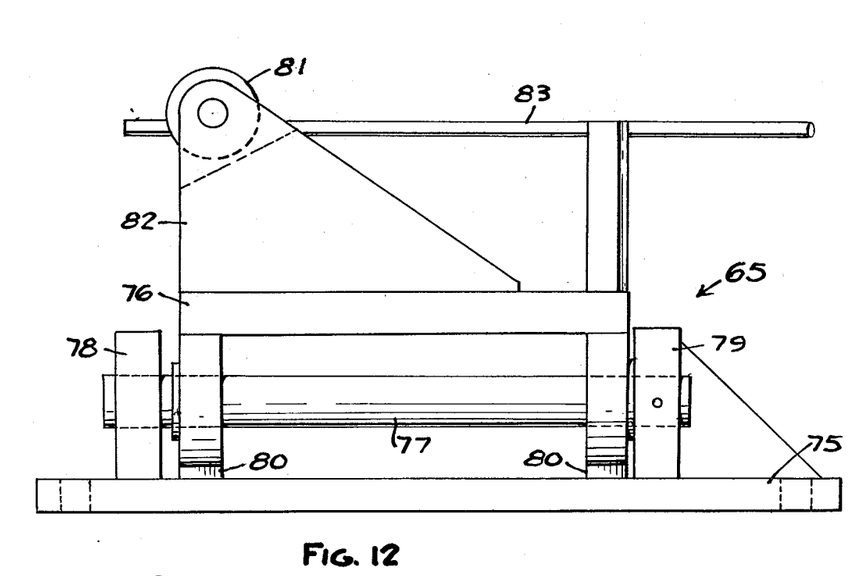
FIG. 12 is an elevational view of a portion of the system.
Figure 13:
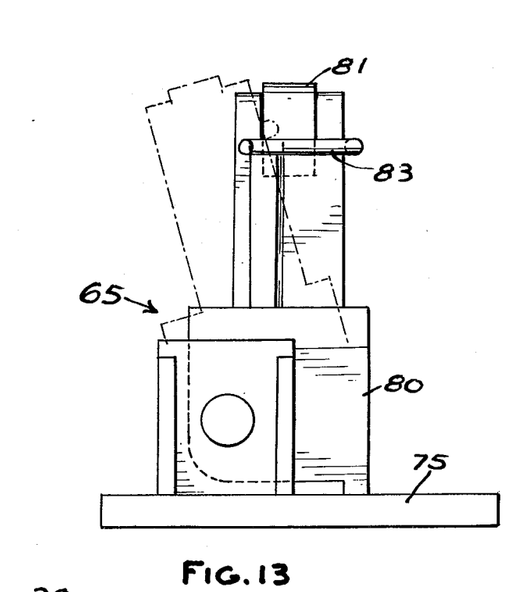
FIG. 13 is an end view of the same.

Each of the latches 65, 66 is identical in construction and, for purposes of clarity, only one will be further described. Referring to FIGS. 12 and 13, latch 65 comprises a base 75 and a bracket 76 mounted for pivotal movement about a horizontal axis defined by a shaft 77 that is supported between stanchions 78, 79 on the base 75. The bracket 76 includes a counterweight portion 80 that normally holds the bracket in upright position. A cam or guide bar 83 extends horizontally and, as shown in FIG. 1, provides a surface to permit deflecting of the latch counter-clockwise to the broken line position as shown in FIG. 13 as the transfer car moves to a pick-up or load station. A roller 81 is mounted about a horizontal axis on an upstanding wall 82 of the bracket 76 and is adapted to engage the periphery of the cam 63, 64 or as the case may be, to prevent movement of the transfer car away from one station toward another station (FIG. 6).

OPERATION

Figure 16:
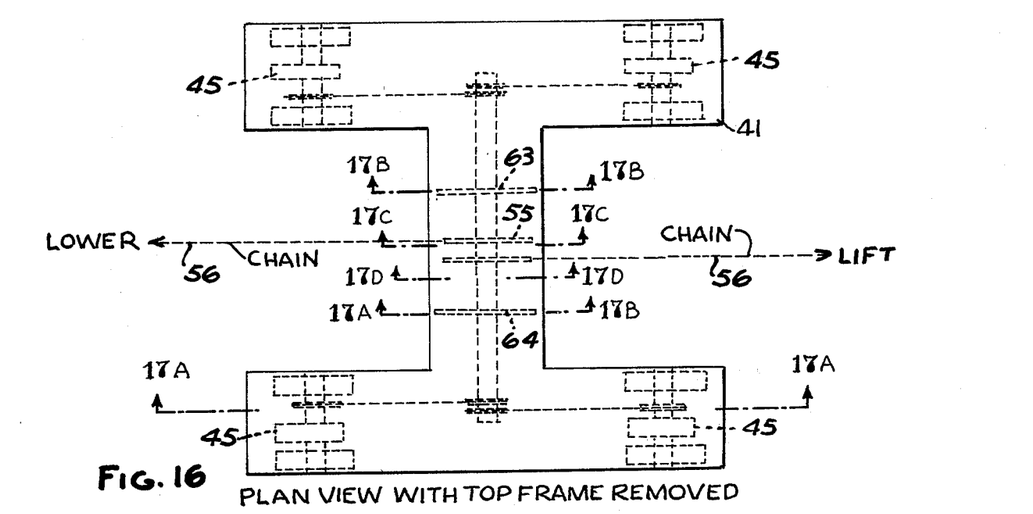
FIG. 16 is a diagrammatic plan view of a portion of the system.
Figure 17A:
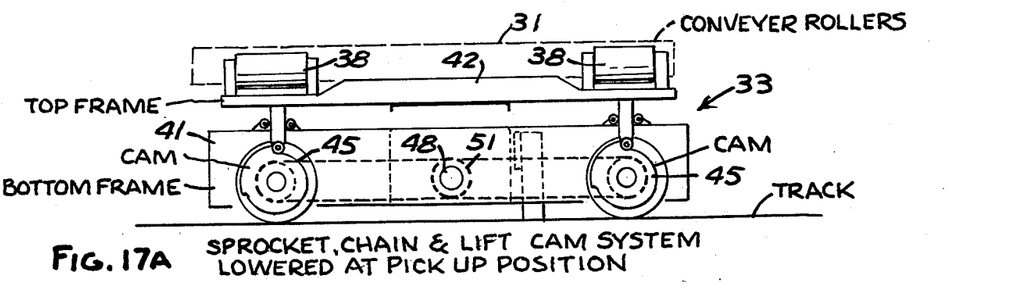
FIGS. 17A-E inclusive are diagrammatic sectional views showing the relative positions of the parts when a transfer car is at a pick up position.
Figure 17B:
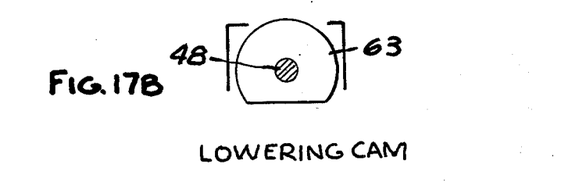
Figure 17C:
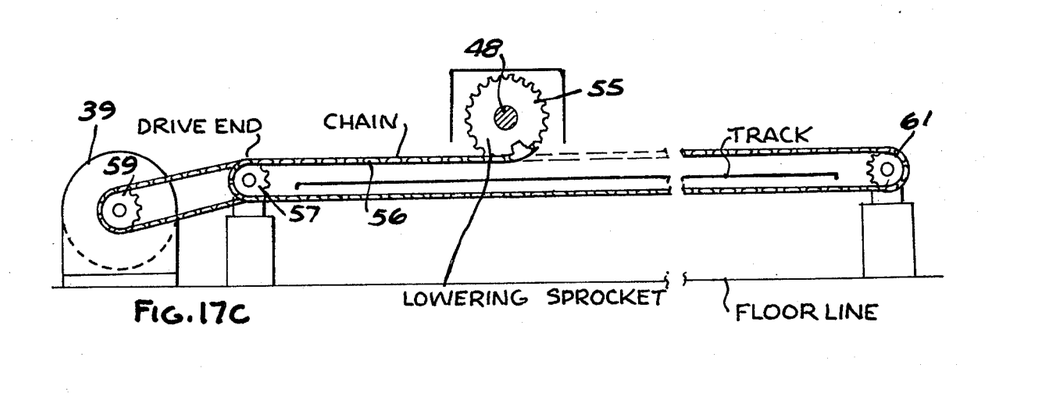
Figure 17D:
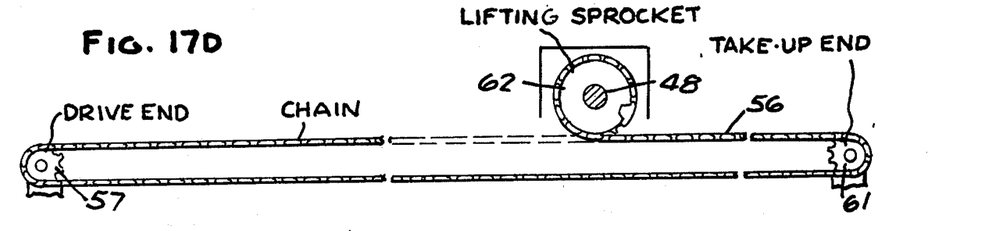
Figure 17E:
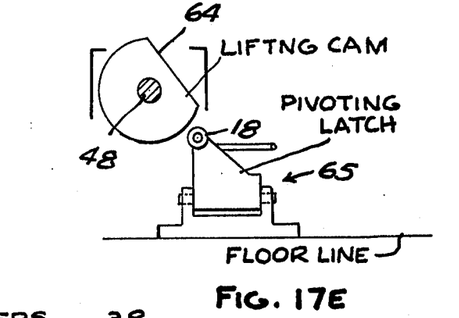

The operation may be more readily understood by reference to FIGS. 16-23. FIG. 16 is a schematic plan view of the transfer car showing various section lines AA — EE inclusive. FIGS. 17A-E, FIGS. 18A-E, FIGS. 19A-E, FIGS. 20A-E, FIGS. 21A-E, 22A-E and FIG. 23 are schematic section views at the section lines AA — EE inclusive at the various portions of the operation of the system.

As shown in FIGS. 17A-E, when the transfer car 33 is at the pick-up station in position to pick-up a load from the conveyor, the wheel cams 45 are such that the rollers 38 are in the lowered position. The lowering cam 63, lowering sprocket 55, lifting sprocket 62 and lifting cam 64 are in the position shown with the roller 81 of latch 65 engageing the periphery of the lifting cam.

Figure 18A:
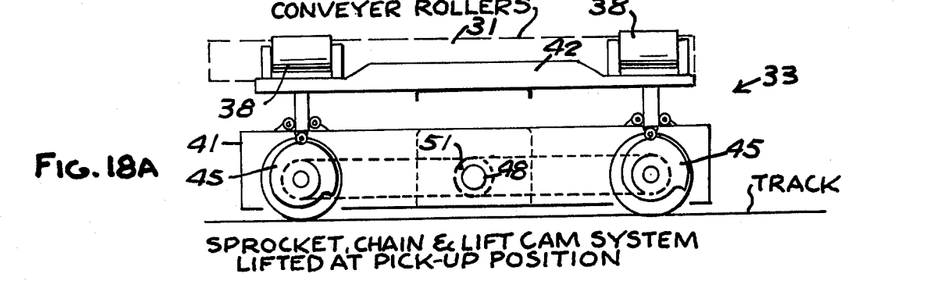
FIGS. 18A-E inclusive are schematic sectional views showing the relative positions of the parts when the load has been lifted by the transfer car at the pick up station.
Figure 18B:
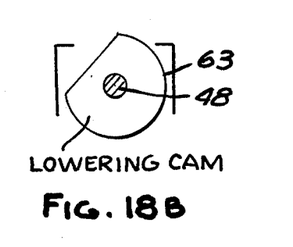
Figure 18C:
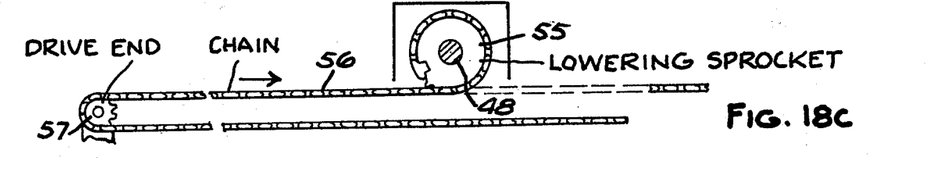
Figures 18D, 18E:
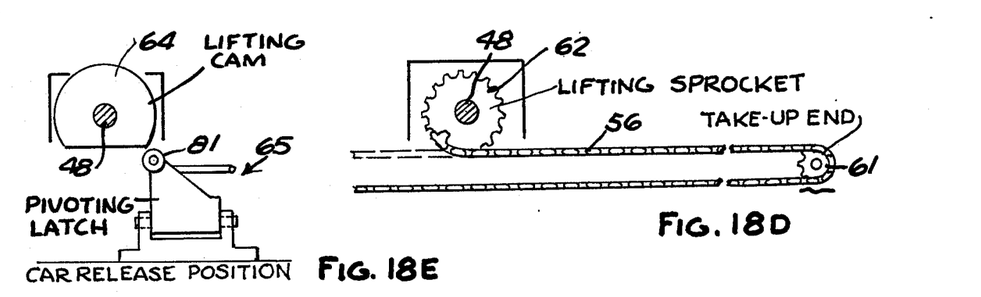
Figure 19A:
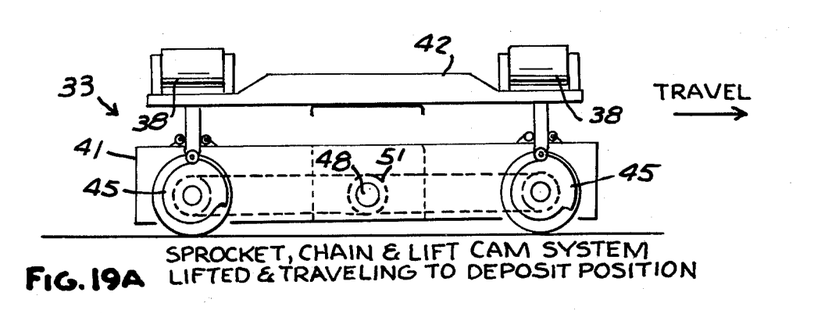
FIGS. 19A-E inclusive are schematic sectional views showing the relative positions of the parts as the transfer car with the lifted load thereon travels to the deposit position.
Figure 19B:
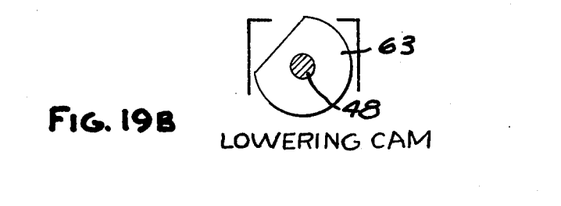
Figure 19C:
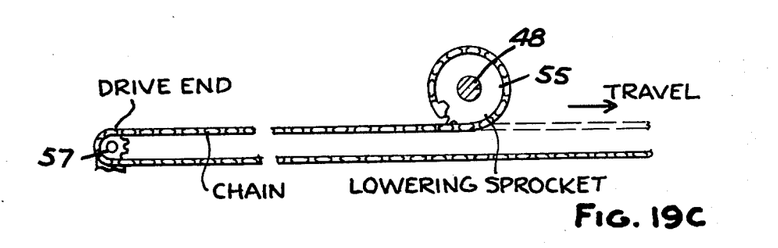
Figure 19D:
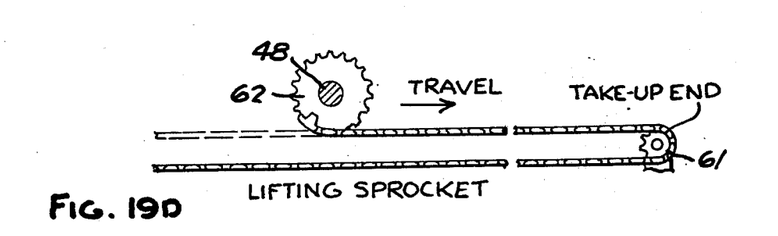
Figure 19E:
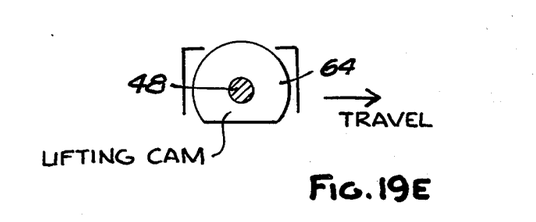

Thus when the motor is energized to move the chain in the direction shown by the arrows in FIG. 18D, the various parts are moved in the direction of the arrows and the sprocket 62 functions to rotate the axle 48 and the lifting cam 64 to, in turn, drive the wheel cams 45 lifting the upper frame and, in turn, the rollers 38 to a position when a load will be lifted off the conveyor.

Continued drive to the chain 56 in the same direction will cause the cam 64 to rotate until the roller 81 on the pivoting latch 65 reaches the flat of the cam 64 so that continuing movement of the chain 56 will now move the transfer car toward the deposit position or station. This condition of movement toward the deposit station is shown in FIGS. 19A-E.

Figure 20A:
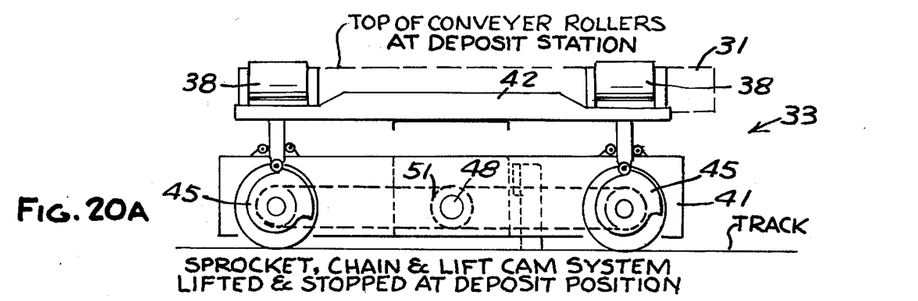
FIGS. 20A-E inclusive are schematic sectional views showing the relative positions of the parts as the transfer car is stopped at the deposit position.
Figure 20B:
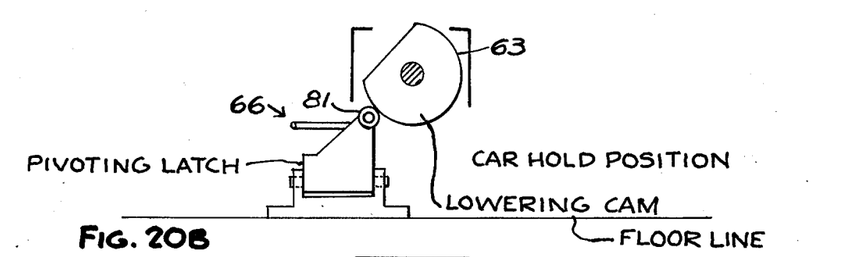
Figure 20C:
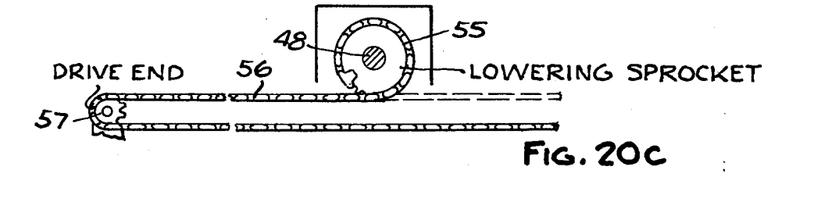
Figure 20D:
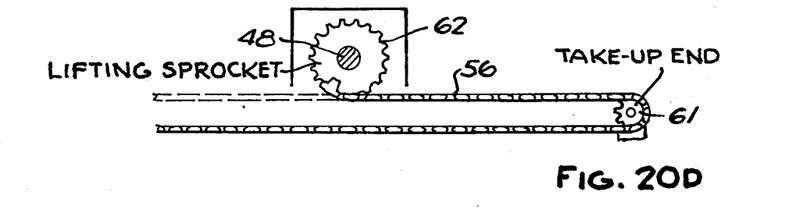
Figure 20E:
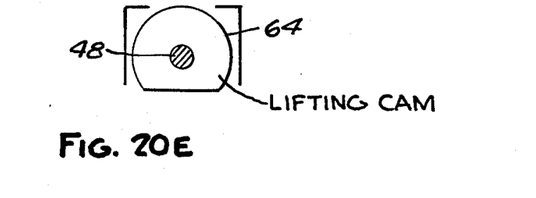
Figure 21A:
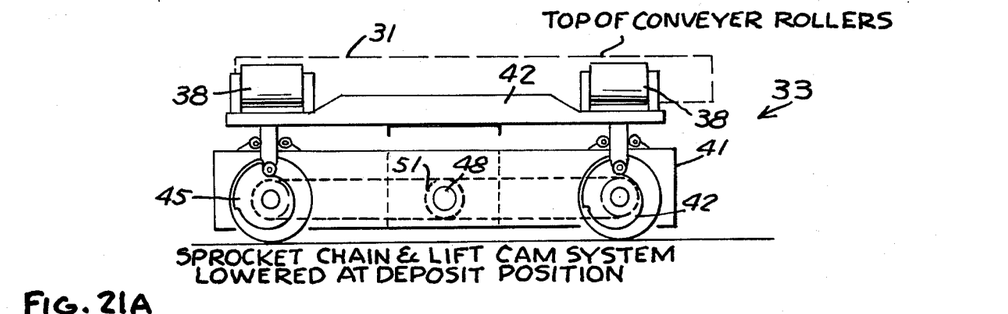
FIGS. 21A-E inclusive are schematic sectional views showing the relative positions of the parts as the load is lowered at the deposit position.
Figure 21B:
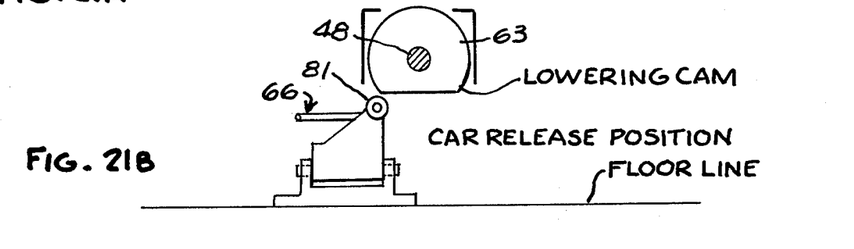
Figure 21C:
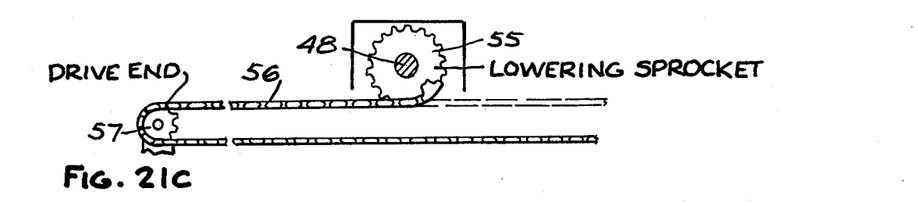
Figure 21D:
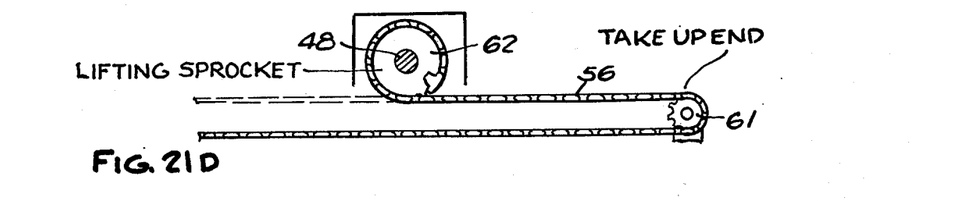
Figure 21E:
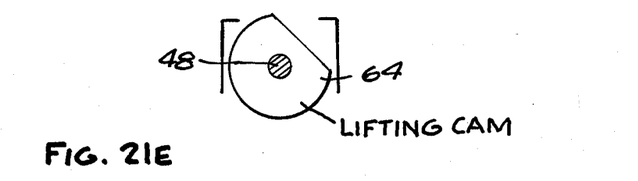
Figure 22A:
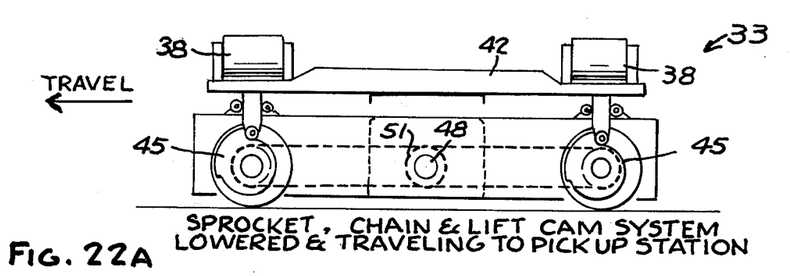
FIGS. 22A-E inclusive are schematic sectional views showing the relative positions of the parts as the transfer car lowers the load at the deposit position and begins travel toward the pick-up station.
Figure 22B:
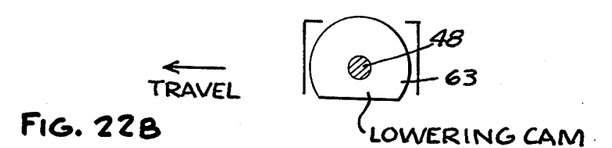
Figure 22C:
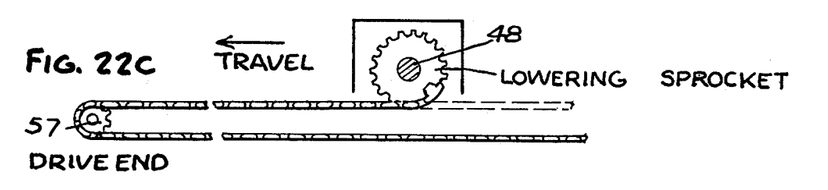
Figure 22D:
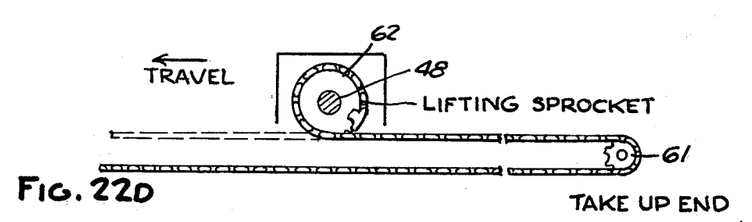
Figure 22E:
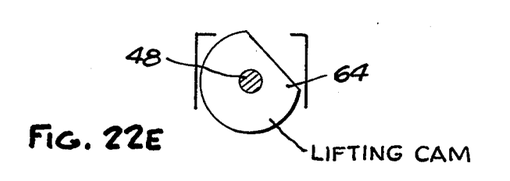

As the transfer car reaches the deposit position, the pivoting latch 66 is initially deflected out of the way and then the roller 81 thereon is permitted to engage the periphery of the lowering cam 63, with the remaining parts having the relative positions shown in FIGS. 20C, D and E.

When the motor drive is reversed to drive the chain 56 in the opposite direction, the chain rotates shaft 48 through sprockets 55 and initially the roller 81 on pivoting latch 66 prevents movement of the transfer car so that the axle 48 will be rotated to rotate, in turn, the wheel cams 45 and lower the rollers 48 depositing the load at the deposit station (FIGS. 21A-E). Continued movement of the chain 56 in the same direction will bring the roller 81 to the position where it clears the cam 63 so that the transfer car will then move toward the pick-up station.

The condition of the parts as the transfer car moves toward the pick-up station is shown in FIGS. 22A-E.

Although the operation has been described in connection with movement between a conveyor and a station, it can be understood that the apparatus can also be utilized to transfer between two stations or from a station to a conveyor or between conveyors.

The operation of the motor to cause lifting and lowering movement can be manually controlled but, in the preferred arrangement, the control is automatic so that when a load and transfer car are at the pick-up station, indicated by closing of limit switches LS1 and LS2, the motor is operated to raise the load and move the transfer car to the deposit station; when the transfer car reaches the deposit station, as indicated by closing of limit switch LS3, the motor is reversed to lower the load and deposit it at the pick-up station; when the load has been deposited, as indicated by closing of limit switch LS4, the motor movement is reversed to return the transfer car to the pick-up station. In addition, it is preferred that in order to provide for greater capacity, a limit switch LS5 be provided in the path of the elevated load as it moves from the pick-up station to the deposit station so that the conveyor can be stopped to deposit another load at the pick-up station while the transfer car is carrying a load to the deposit station.

Figures 14, 15:
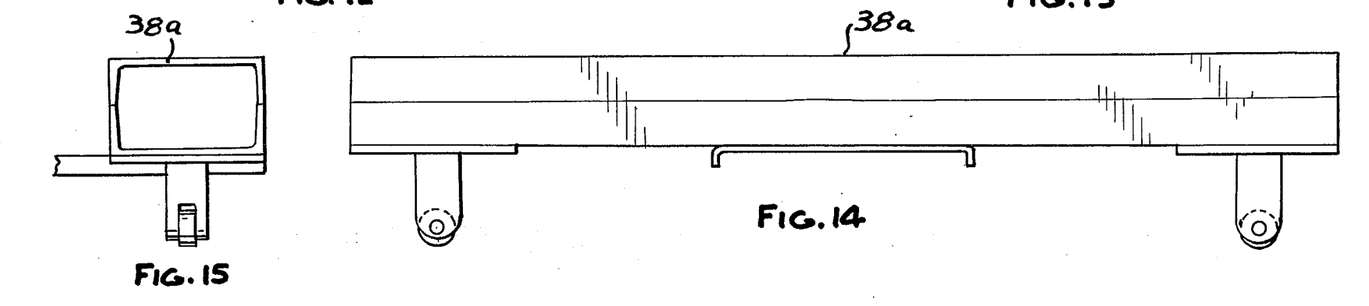
FIG. 14 is a side elevational view of a modified part of a system.
FIG. 15 is an end view of the same.

In the modified form of upper frame shown in FIGS. 14 and 15, the rollers 38 are eliminated and the support bars 38a only are provided for supporting the load. Such an arrangement can be utilized where the load is light and can be centered by the guide rails easily as the transfer car moves from the pick-up station to the deposit station.

However, where the load is quite heavy and it is necessary to position the load accurately relative to the deposit station for pick-up by an automatic device such as a crane, the rollers 38 are preferred.

As the transfer car moves toward the deposit station from the pick-up station, the guide bars 83 guide the load and accurately position it so that it can be deposited properly at the deposit station and any automated device such as a crane will readily be able to pick it up.

I claim:

1. In an apparatus for transferring loads between a conveyor and a station, the combination comprising
   a conveyor,
   a transfer car,
   means for supporting said car for movement between said conveyor and said station,
   said car having interdigitating means thereon adapted to interdigitate with said conveyor when the transfer car is at a position adjacent said conveyor,
   means for supporting and operating said interdigitating means for vertical movement such that said means may be moved upwardly to lift a load from said conveyor or said station and downwardly to lower said load on said conveyor or said station,
   a power source positioned in fixed position relative to said conveyor and said station,
   means extending between said power source and said transfer car for moving said transfer car between said conveyor and said transfer station,
   said means for lifting and lowering said interdigitating means comprising a cam,
   a cam follower on said interdigitating means such that upon rotation of said cam, said interdigitating means is lowered and lifted,
   said means for driving said transfer car comprising a chain driven from a position adjacent said conveyor,
   a first sprocket and a second sprocket,
   said chain having one end thereof connected to one sprocket,
   the other end of said chain being connected to another sprocket,
   a shaft rotatably mounted on said transfer car,
   said sprockets being mounted and fixed on said shaft,
   means interconnecting said shaft and said first-mentioned cam,
   a pair of cams on said shaft,
   and latch means positioned along the path of the transfer car for selectively engaging one or the other of said pair of cams to hold the transfer car in position adjacent said conveyor and said transfer position, respectively, so that upon movement of said chain, one of said sprockets or the other of said sprockets is rotated to actuate the drive to said cams of said lifting and lowering means for lifting and lowering said interdigitating means.

2. The combination set forth in claim 1 wherein said latch means along the path comprise pivoting latches actuated by movement of the transfer car to the conveyor and transfer position, respectively.

3. In an apparatus for transferring articles between a conveyor and a station, the combination comprising
   a conveyor,
   said conveyor comprising a roller conveyor including a plurality of longitudinally spaced transversely extending rollers,
   a transfer car,
   said transfer car including a bottom frame assembly and a top frame assembly,
   means for supporting said bottom frame assembly for movement between said conveyor and said station,
   said top frame assembly having interdigitating means thereon adapted to interdigitate with said conveyor when the transfer car is at a position adjacent said conveyor,
   means for supporting said interdigitating means for vertical movement such that said means may be moved upwardly to lift a load from said conveyor and downwardly to lower a load at said station,
   means for moving said car between said conveyor and said station,
   means receiving power from said last-mentioned means for lifting and lowering said interdigitating means,
   said means for moving said car comprising a power source positioned in fixed position relative to said conveyor and said station,
   means extending between said power source and said transfer car for moving said transfer car between said conveyor and said transfer station,
   control means in the path of the transfer car operable to actuate said means for supporting said interdigitating means to raise and lower said top frame assembly as the car is moved to said conveyor and said station, respectively,
   said means for lifting and lower said interdigitating means comprising a plurality of cams,
   a cam follower individual to each said cam on top frame and engaging said cam such that upon rotation of said cam, said interdigitating means is lowered and lifted,
   said means extending from said power source comprising a chain driven by said power source adjacent said conveyor,
   a first sprocket and a second sprocket,
   said chain having one end thereof connected to the first sprocket,
   the other end of said chain being connected to said second sprocket,
   a shaft rotatably mounted on said transfer car,
   said sprockets being mounted and fixed to said shaft, means drivingly interconnecting said shaft and said cams, a pair of cams on said shaft, and latch means positioned along the path of the transfer car for selectively engaging one or the other of said pair of cams to hold the transfer car in position adjacent said conveyor and said transfer position, respectively, so that upon movement of said chain, one of said sprockets or the other of said sprockets on said shaft is rotated to actuate the drive to said cams of said lifting and lowering means for lifting and lowering said interdigitating means.

4. The combination set forth in claim 3 wherein said means along the path comprise pivoting latches actuated by movement of the transfer car to the conveyor and transfer position, respectively.

5. In an apparatus for transferring loads between stations, the combination comprising a conveyor, a transfer car, means for supporting said car for movement between said conveyor and said station, said car having support means thereon adapted to support a load when the transfer car is at a position adjacent said conveyor, said transfer car comprising a bottom frame assembly and a top frame assembly on which said load support means is mounted, means on said bottom frame assembly for guiding said top frame assembly for straight vertical movement relative to said bottom frame assembly, and means for lifting and lowering said top frame assembly comprising cam means rotatably mounted on said bottom frame assembly, cam follower means on said top frame assembly engaging said cam means such that upon rotation of said cam means, said top frame assembly is lowered and lifted, and means for driving said transfer car between said station comprising a power source positioned in fixed position relative to said stations, a sprocket rotatably mounted adjacent each station, a chain trained over said sprocket and driven by said power source, a shaft rotatably mounted on said bottom frame assembly of said transfer car, a pair of sprockets fixed on said shaft, drive means interconnecting said shaft and said cam means of said lifting and lowering means, one end of said chain being attached to one of said pair of sprockets and the other end of said chain being attached to the other of said sprockets, means extending between said shaft and said cam means such that when said shaft is rotated in one direction, said cam means is rotated to lift said top frame assembly, and when said shaft is rotated in the opposite direction, said cam means is rotated to lower said top frame assembly, a pair of cam means fixed on said shaft, and latch means positioned along the path of said transfer car for selectively engaging one or the other of said cam means on said shaft to hold the transfer car stationary adjacent one or the other of said stations so that upon movement of said chain, one of said sprockets or the other of said sprockets on said shaft is rotated in a direction to actuate said drive means to said cam means of said means for lifting and lowering said top frame assembly to lift and lower said support means thereon.

6. The combination set forth in claim 5 wherein said pair of cams on said shaft includes a flat portion which is engaged by said latch means to prevent continued rotation of said shaft so that continued movement of said chain will move said transfer car toward one or the other of said stations.

7. The combination set forth in claim 5 wherein said drive means interconnecting said shaft and said cam means of said lifting and lowering means comprises sprocket and chain means.

8. The combination set forth in claim 5 wherein said cam means of said lifting and lowering means comprises cams at spaced points along the sides of said bottom frame assembly.

9. In an apparatus for transferring loads between stations, the combination comprising a transfer car, said car having support means thereon adapted to support a load when the transfer car is at a position adjacent a conveyor, said transfer car comprising a bottom frame assembly and a top frame assembly on which said load support means is mounted, means on said bottom frame assembly for guiding said top frame assembly for straight vertical movement relative to said bottom frame assembly, and means for lifting and lowering said top frame assembly comprising cam means rotatably mounted on said bottom frame assembly, cam follower means on said top frame assembly engaging said cam means such that upon rotation of said cam means, said top frame assembly is lowered and lifted, a shaft rotatably mounted on said bottom frame assembly of said transfer car, a pair of sprockets fixed on said shaft, drive means interconnecting said shaft and said cam means of said lifting and lowering means, one end of a chain adapted to be attached to one of said pair of sprockets and the other end of the chain being attached to the other of said sprockets, means extending between said shaft and said cam means such that when said shaft is rotated in one direction, said cam means is rotated to lift said top frame assembly, and when said shaft is rotated in the opposite direction, said cam means is rotated to lower said top frame assembly.

a pair of cam means fixed on said shaft adapted to be engaged by latch means along the path of said carrier.

10. The combination set forth in claim 9 wherein said drive means interconnecting said shaft and said cam means of said lifting and lowering means comprises sprocket and chain means.

11. The combination set forth in claim 9 wherein said cam means of said lifting and lowering means comprises cams at spaced points along the sides of said bottom frame assembly.

* * * * *